United States Patent
TeWinkle

(10) Patent No.: US 6,967,683 B2
(45) Date of Patent: Nov. 22, 2005

(54) IMAGING APPARATUS WITH MULTIPLE LOCAL CLOCKS FOR READOUT FROM A LARGE NUMBER OF PHOTOSENSORS

(75) Inventor: Scott L. TeWinkle, Ontario, NY (US)

(73) Assignee: Xerox Corporation, Stamford, CT (US)

(*) Notice: Subject to any disclaimer, the term of this patent is extended or adjusted under 35 U.S.C. 154(b) by 782 days.

(21) Appl. No.: 09/797,297

(22) Filed: Mar. 1, 2001

(65) Prior Publication Data
US 2002/0122125 A1  Sep. 5, 2002

(51) Int. Cl.[7] .......................... H04N 3/14; H04N 5/335
(52) U.S. Cl. .................................................. 348/308
(58) Field of Search ............................... 348/294, 241, 348/302, 308; 250/208.1; 358/482

(56) References Cited

U.S. PATENT DOCUMENTS

| | | | |
|---|---|---|---|
| 4,602,290 A * | 7/1986 | Kondo et al. | 348/302 |
| 5,081,536 A | 1/1992 | Tandon et al. | 358/213.31 |
| 5,097,338 A * | 3/1992 | Kuriyama et al. | 358/471 |
| 5,153,421 A * | 10/1992 | Tandon et al. | 348/243 |
| 5,638,121 A | 6/1997 | Hosier et al. | 348/312 |
| 6,335,805 B1 * | 1/2002 | Ishiguro et al. | 358/474 |
| 6,570,615 B1 * | 5/2003 | Decker et al. | 348/272 |

FOREIGN PATENT DOCUMENTS

| | | | | |
|---|---|---|---|---|
| JP | 05101689 A1 * | 4/1993 | | G11C 19/00 |
| JP | 09233393 A1 * | 9/1997 | | H04N 5/335 |

* cited by examiner

Primary Examiner—Thai Tran
Assistant Examiner—Jason Whipkey
(74) Attorney, Agent, or Firm—R. Hutter

(57) ABSTRACT

In an imaging device having an array of photosensors, each photosensor being associated with a shift register stage for reading out image signals, there is provided a number of local clock drivers, each local clock driver being associated with a subset of photosensors. A reset flip-flop is associated with each subset of photosensors, and is used to "hand off" shift register activities from one local clock driver to the next as image data is read out. By having a series of local clock drivers, performance problems related to parasitic capacitance on the shift register lines are lessened.

5 Claims, 2 Drawing Sheets

IMAGING APPARATUS WITH MULTIPLE LOCAL CLOCKS FOR READOUT FROM A LARGE NUMBER OF PHOTOSENSORS

CROSS-REFERENCE TO RELATED APPLICATION

Cross-reference is made to the following application, assigned to the assignee hereof and being filed simultaneously herewith: IMAGING APPARATUS WITH SELECTABLE SUBSETS OF PHOTOSENSORS, U.S. Ser. No. 09/797,295.

INCORPORATION BY REFERENCE

The present application incorporates by reference U.S. Pat. Nos. 5,081,536 and 5,638,121, assigned to the assignee hereof.

FIELD OF THE INVENTION

The present invention relates to image sensor arrays used in input scanners or digital cameras. In particular, the invention relates to photosensitive chips wherein each photosensor has its own individual transfer circuit.

BACKGROUND OF THE INVENTION

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, one design includes an array of photosensors of a width comparable to the width of a page being scanned, to permit one-to-one imaging generally without the use of reductive optics. In order to provide such a "full-width" array, however, relatively large silicon structures must be used to define the large number of photosensors. One technique to create such a large array is to make the array out of several butted silicon chips. In one proposed design, an array is intended to be made of 20 silicon chips, butted end-to-end, each chip having 248 active photosensors spaced at 400 photosensors per inch.

FIG. 2 is a schematic view showing a set of photosensors $10a$–$10z$ in a linear array, as would be found, for example, on a CMOS photosensitive device. The photosensors $10a$–$10z$, which are typically in the form of photodiodes or photogates (depleted-gate photosensors), are operatively connected to a common video line 12, onto which each photosensor $10a$–$10z$ outputs a voltage representative of the light incident thereon at a particular time. As is known in the art such as in the patents incorporated by reference, each photosensor $10a$–$10z$ may further include, in addition to a photodiode, any number of ancillary devices, such as individual transfer circuits or amplifiers.

Each photosensor $10a$–$10z$ is connected to common video line 12 via an individual transistor switch, here shown as 14. The transistor switch 14 associated with the photosensor is independently controllable, for example, by application of a voltage to the gate of the transistor. Such a gate voltage closes the switch 14 so that a particular photosensor 10 may output a voltage signal onto the common video line 12 at the desired time for a coherent readout routine.

In order to read out the image signals from a sequence of photosensors $10a$–$10z$ in a manner convenient for image-processing apparatus, there is preferably associated with every transistor chip 14, a shift register, which comprises a set of what are known as "stages" 20. The stages 20 are arranged in series along a line 22, and are controllable via a pixel clock line 24.

According to a familiar method of operation of a shift register, each stage 20 along line 22 is capable of activating a particular transistor switch 14 associated with one photosensor $10a$–$10z$. Ordinarily, each stage 20 "holds" a logical digital 0, unless and until there is entered into the particular stage 20 a digital 1, which is typically a one-cycle voltage pulse, along line 22. The single digital 1 is propagated along line 22, from one stage 20 to the next. When the 1 activates a particular stage 20, the associated transistor switch 14 is caused to make a connection between the associated photosensor 10 and the common video line 12. Operating the iteration of the digital 1 along line 22 is a pixel clock, in the form of a square wave of predetermined frequency apparent on line 24. This pixel clock signal $\Phi_S$ activates one stage 20 along line 22 with every on-and-off cycle thereof. In this way, the photosensors $10a$–$10z$ are activated in a coherent sequence.

In practical applications of a system such as shown in the Figure, it has been found that the performance of the shift register and its associated circuitry may degrade significantly as the overall length of the device increases. Mainly, a long line for transmission of the pixel clock signal such as $\Phi_S$ will have a large parasitic capacitance, as well a parasitic resistance, which will adversely affect the rise-fall time of signals on the line. The present invention is directed toward a design which circumvents this problem, so that very long devices, which can scan large hard-copy documents such as engineering drawings and posters, can be made.

DESCRIPTION OF THE PRIOR ART

U.S. Pat. Nos. 5,081,536 and 5,638,121, incorporated by reference above, respectively show an implementation of a photosensitive chip wherein each photosensor is associated with a transfer circuit, and an implementation of a shift register used to read out image signals from a set of transfer circuits.

The concept of using multiple local clocks within an integrated circuit on a single chip is generally known in the art of digital devices, but not, to the best knowledge of the inventor hereof, in the specific context of transferring image signals from photosensors in a photosensitive device.

SUMMARY OF THE INVENTION

According to the present invention, there is provided a photosensitive apparatus, comprising a plurality of photosensors, organized in a plurality of subsets of photosensors, each photosensor having a shift register stage associated therewith, at least one photosensor in each subset outputting a signal to a common video line in response to the shift register stage associated therewith being activated. A common shift register line activates a plurality of shift register stages associated with a subset of photosensors. A plurality of local clock drivers are provided, each local clock driver associated with the common shift register line associated with one subset of photosensors, each local clock driver activating a plurality of shift register stages within the subset of photosensors.

DETAILED DESCRIPTION OF THE INVENTION

Figure 1:
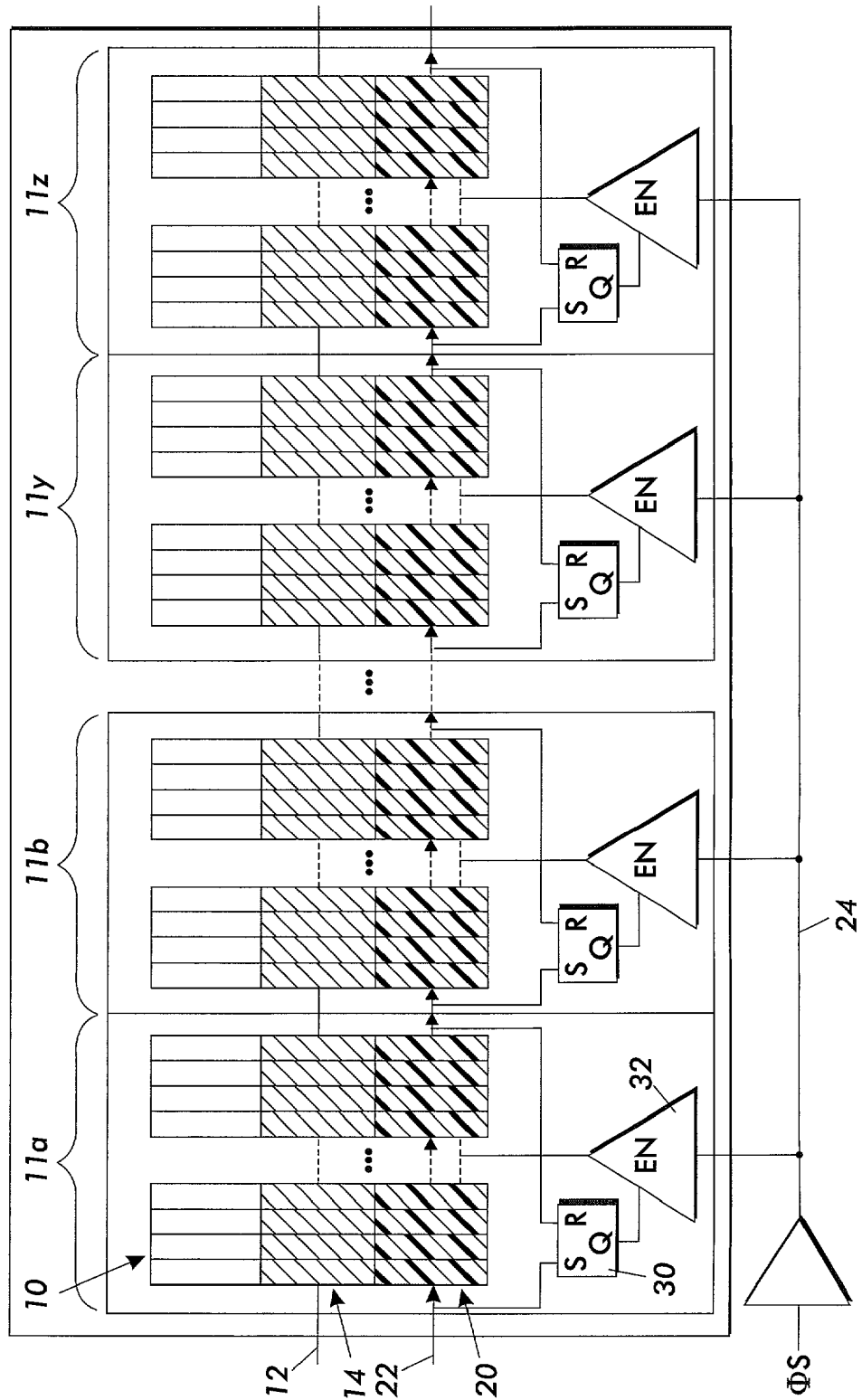
FIG. 1 is a schematic diagram of a photosensitive device incorporating the present invention.

FIG. 1 is a diagram showing the essential elements of the present invention as they relate to a photosensitive device in which a linear array of photosensors output image-related signals onto a video line. Although a single linear array of the photosensors is shown in the Figure, the basic principle can further apply to devices having, for example, three linear arrays of photosensors, each array being filtered to be sensitive to one primary color; or, alternately, a device suitable for recording two-dimensional images. The structure shown in FIG. 1 may reside on a single silicon chip or over several such chips, such as in a full-page-width scanner.

Figure 2:
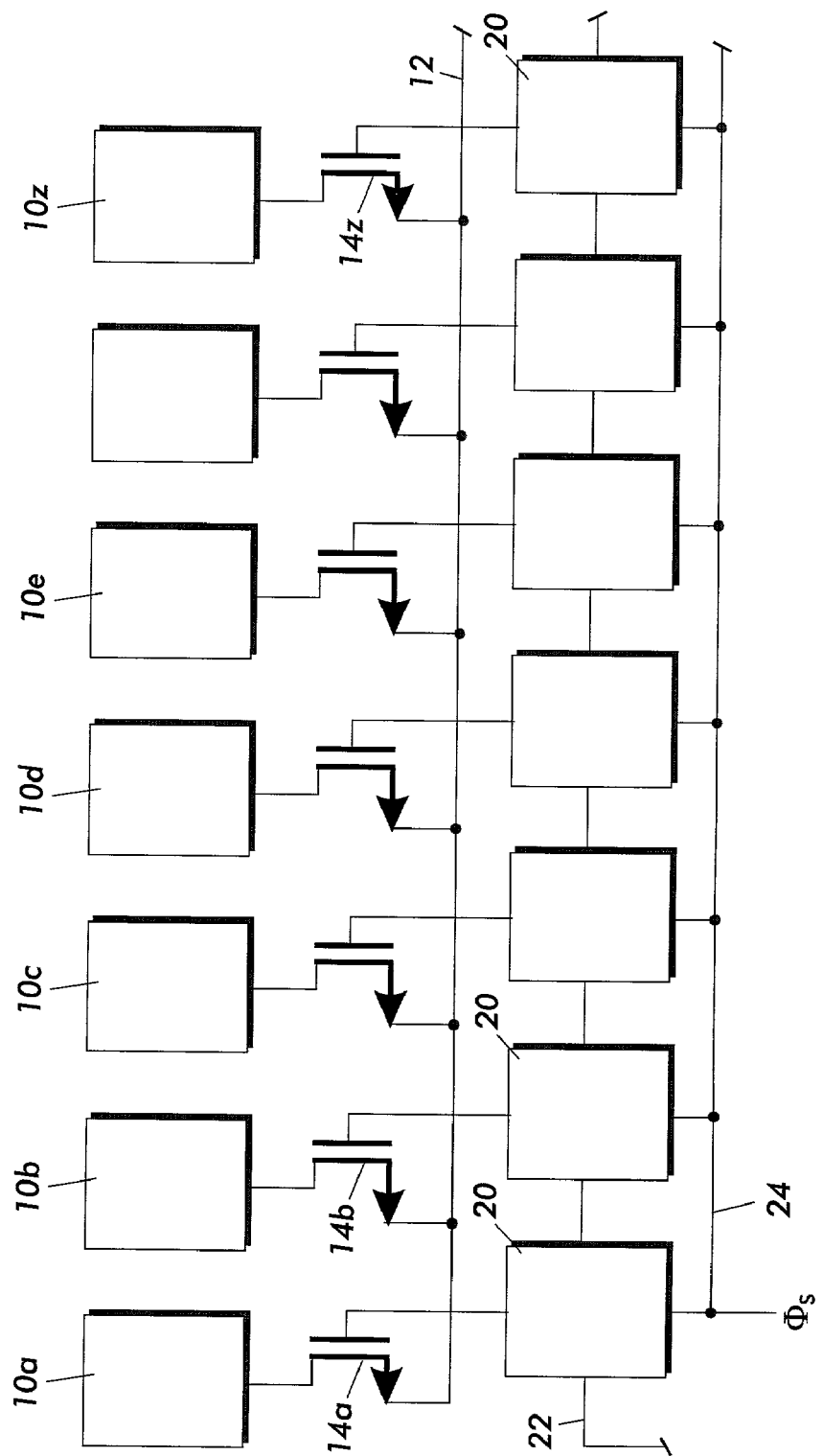
FIG. 2 shows the basic principle of using a shift register to read out image signals from a series of transfer circuits associated with a set of photosensors, as known in the prior art.

In FIG. 1, the reference numerals relate to analogous elements shown in the basic, prior art device shown in FIG. 2. For example, the device in FIG. 1 includes a linear array of photosensors, which can be, for instance, either photodiodes or photogates, and these photosensors are generally indicated as 10. Associated with each photosensor 10 is a transfer circuit generally indicated in each case as 14, which can be of any of a variety of configurations known in the art. What is important is that each transfer circuit 14, when activated, outputs a video signal ultimately derived from its associated photosensor onto a video line 12. Further associated with each transfer circuit 14 is a shift register stage, generally indicated as 20. The shift register stages are disposed in series on a shift register line 22. As described above in the simple case of FIG. 2, a digital 1 is in effect handed off from one stage 20 to the next in sequence, and when this digital 1 enters a particular shift register stage 20, the stage 20 activates its associated transfer circuit 14, causing that transfer circuit 14 to output a signal onto video line 12. In brief, by having the digital 1 move across the device from one stage 20 to the next, the various transfer circuits 14 are sequentially activated, thereby yielding a sequential outputting of video signals from the various transfer circuits 14 onto the video line 12.

Ultimately controlling the operation of the shift register stages 20 is a clock signal, typically in the form of a square wave, which is provided on a line 24 from a basic clock generator within the system (not shown). In the prior art system in FIG. 2, the clock signals on line 24 directly operate the shift register stages 20. However, in a physically large device, use of a single direct line 24 has been shown to have practical difficulties. Basically, a relatively long line 24 will have associated therewith a relatively large parasitic capacitance and resistance, and this will tend to degrade the rise-fall characteristics of a square wave placed on line 24.

It is a key purpose of the present invention to overcome the problem of a very long shift register such as 24, specifically by providing, within a single device, multiple local "clock drivers," each clock driver being a small circuit which operates only a relatively small subset of shift register stages 20 in the entire device. In other words, instead of having a single shift register such as 24 directly operate every shift register stage on a device, the function of activating the shift register stages 20 is divided among a series of local clock drivers. Each local clock driver is small enough to avoid the problems associated with parasitic capacitance.

In FIG. 1, it will be noticed that the photosensors 10 are divided into what can be called subsets of photosensors, and these subsets are indicated as 11a, 11b, . . . 11y, 11z. In the particular illustrated embodiment, the subsets 11 correspond to collinear, contiguous sets of the photosensors in the linear array, but it is conceivable that the subsets could represent parallel linear arrays of photosensors, non-contiguous subsets of photosensors, subsets of photosensors with each subset being filtered to be sensitive to a particular primary color, and/or other configurations of subsets of photosensors, such as in a two-dimensional array. The various defined subsets need not correspond to different silicon chips within a larger device: indeed, there is preferably a number of subsets 11 on each chip in a multi-chip device.

Within each subset 11, there is associated with each photosensor and its transfer circuit 14 a shift register stage 20. It will be noted that each subset 11 of photosensors and associated circuitry is defined by the presence of a single reset flip-flop indicated as 30. The boundaries of a particular subset of photosensors, in this embodiment, are defined by the nodes where the flip-flop 30 is connected to the shift register line 22.

In the illustrated embodiment, the flip-flop 30 is of a reset type, having two inputs S and R, and an output line Q. When a pulse is received by set input S, the output Q flips high; when a pulse is received by reset input R, the output Q flips to zero. The output Q of the flip flop 30 is associated with what can be called an "enabling amplifier" 32. The enabling amplifier 32 functions when the enable input is high, and in effect passes along the clock pulse from clock like 24 onto the shift register stages 20 with which the flip-flop 30 is associated, i.e., the shift register stages 20 associated with the photosensors 10 in the subset 11. When the input from flip-flop output Q is zero, however, the enabling amplifier 32 shuts off.

With reference to, for example, subset 11a in FIG. 1, the system of the present invention operates as follows. When a digital 1 from whatever source is received on line 22 and enters the first shift register stage 20 in the Figure, the digital 1 will also cause a pulse to be created on the set input by S on the flip-flop 30 which is associated with subset 11a. When this pulse is received, flip-flop 30 will cause output Q to go high and thereby activate the enabling amplifier 32. When amplifier 32 is enabled, the clock pulse on clock line 24 is passed to the amplifier 32 causing passing of the digital 1 through the shift register stages 20, in a sequence, within the particular subset 11a. When the last, or in this case right hand side, shift register stage 20 is reached, the digital 1 will cause a pulse to be received by the reset input R of flip-flop 30. When this occurs, the output of flip-flop 30 will go to zero, thereby causing the enabling amplifier 32 to be disabled and effectively shutting off any activity in subset 11a. The exit of the digital 1 from the rightmost stage 20 in subset 11a to the leftmost stage 20 in subset 11b will similarly create a pulse on the input S of the flip-flop 30 associated with subset 11b, thus performing a "hand off" of the digital 1 from one subset 11a to the next. This handoff will continue all the way through the device, in this case to the rightmost shift register stage in subset 11z.

With reference to the terms used in the claims herein, the term "clock driver" should be construed broadly to refer to any type of hardware which enables a readout for a specific subset of photosensors in a device. In the illustrated embodiment, for instance, each flip-flop 30 and amplifier 32 combination performs this function for its associated subset 11*a*, 11*b*, etc. of photosensors; however, it will be apparent that different sets of hardware can perform an analogous function in devices of other designs. The term "sequencing means" should be construed broadly as any arrangement, in hardware and/or software, in which the conclusion, or near-conclusion, of readout functions of one subset of photosensors causes a readout function to begin with regard to another subset of photosensors. In the present embodiment this is done by the fact that a line going to the reset input of a flip-flop 30 for a first subset of photosensors is near or intersects a line going to the set input of a flip-flop 30 for a second subset of photosensors; once again, various arrangements to perform an analogous function will be apparent.

The ultimate source of pulses to the series of enabling amplifiers 32 among the various subsets across the device is clock line 24. Whereas, in the prior art system of FIG. 2, the clock line 24 directly operates at the shift register stages 20 for every photosensor in the entire device, in this embodiment in the invention, the clock line 24 is connected only to a single line for each subset 11 of photosensors. This relative reduction in the number of nodes and lines on a clock line 24 results in less parasitic capacitance. Further, because each subset of photosensors 10 is physically smaller than the entire device, there is less parasitic capacitance associated with each individual subset as opposed to the entire device.

What is claimed is:

1. A photosensitive apparatus, comprising at least one silicon chip, the silicon chip including:

a plurality of photosensors, organized in a plurality of subsets of photosensors, each photosensor having a shift register stage associated therewith, at least one photosensor in each subset outputting a signal to a common video line in response to the shift register stage associated therewith being activated;

a common shift register line for activating a plurality of shift register stages associated with a subset of photosensors; and for each subset of photosensors, a local clock driver, the local clock driver including an enabling amplifier operatively disposed between the common shift register line and the shift register stages in the subset of photosensors, and a flip-flop associated with a first and last photosensor in the subset, the flip-flop outputting an enabling signal to the enabling amplifier.

2. The apparatus of claim 1, further comprising sequencing means for causing a second local clock driver to begin sequentially activating a plurality of shift register stages within its subset of photosensors, as a result of a first local clock driver finishing activating a plurality of shift register stages within its subset of photosensors.

3. The apparatus of claim 1, the flip-flop in each local clock driver having a set input associated with a first shift register stage in the subset of photosensors, and a reset input associated with a last shift register stage in the subset of photosensors.

4. The apparatus of claim 1, the last shift register stage associated with the first local clock driver being connected in series with a first shift register stage associated with the second local clock driver.

5. The apparatus of claim 1, wherein a first subset of photosensors forms a first linear array of contiguous photosensors, and a second subset of photosensors forms a second linear array of contiguous photosensors.

\* \* \* \* \*